United States Patent
Latham

(10) Patent No.: US 7,889,480 B2
(45) Date of Patent: Feb. 15, 2011

(54) PANELBOARD

(75) Inventor: Dean S Latham, Wichita Falls, TX (US)

(73) Assignee: ABB Inc., Cary, NC (US)

( * ) Notice: Subject to any disclaimer, the term of this patent is extended or adjusted under 35 U.S.C. 154(b) by 152 days.

(21) Appl. No.: 12/137,296

(22) Filed: Jun. 11, 2008

(65) Prior Publication Data

US 2009/0040691 A1 Feb. 12, 2009

Related U.S. Application Data

(60) Provisional application No. 60/954,231, filed on Aug. 6, 2007.

(51) Int. Cl.
*H02B 1/04* (2006.01)
*H02B 1/20* (2006.01)
*H02B 1/26* (2006.01)

(52) U.S. Cl. .................. 361/634; 361/648; 361/624; 361/636

(58) Field of Classification Search ............. 361/622, 361/624, 627, 628, 639, 640, 641, 644, 645, 361/648, 652, 656, 658, 667, 673, 633–637, 361/655, 601, 602, 670, 671, 679.01, 724, 361/725

See application file for complete search history.

(56) References Cited

U.S. PATENT DOCUMENTS

| 2,738,444 | A | * | 3/1956 | Casey | ............... 361/649 |
| 4,251,851 | A | | 2/1981 | Diersing et al. | |
| 4,916,574 | A | | 4/1990 | Hancock et al. | |
| 5,046,173 | A | * | 9/1991 | Wall, Jr. | ............... 361/634 |
| 5,272,592 | A | | 12/1993 | Harris et al. | |
| 6,002,580 | A | | 12/1999 | LeVantine et al. | |
| 2006/0256508 | A1 | * | 11/2006 | Kim et al. | ............... 361/622 |

FOREIGN PATENT DOCUMENTS

| EP | 0859438 A2 | 8/1998 |
| EP | 1139531 A2 | 4/2001 |
| WO | PCT/US2008/007301 | 12/2008 |

* cited by examiner

*Primary Examiner*—Jayprakash N Gandhi
*Assistant Examiner*—Jerry Wu
(74) *Attorney, Agent, or Firm*—Paul R. Katterle; Michael C. Prewitt

(57) ABSTRACT

A panelboard mounts and electrically connects to a plurality of circuit breakers. The panelboard includes a central body portion having a top surface. At least one bus bar is positioned within the central body portion. A pair of opposed legs extend the longitudinal length of the central body portion. A plurality of wells extend downwardly from the top surface and have prongs at the bottom of each well. The prongs are electrically connected to the bus bar.

12 Claims, 12 Drawing Sheets

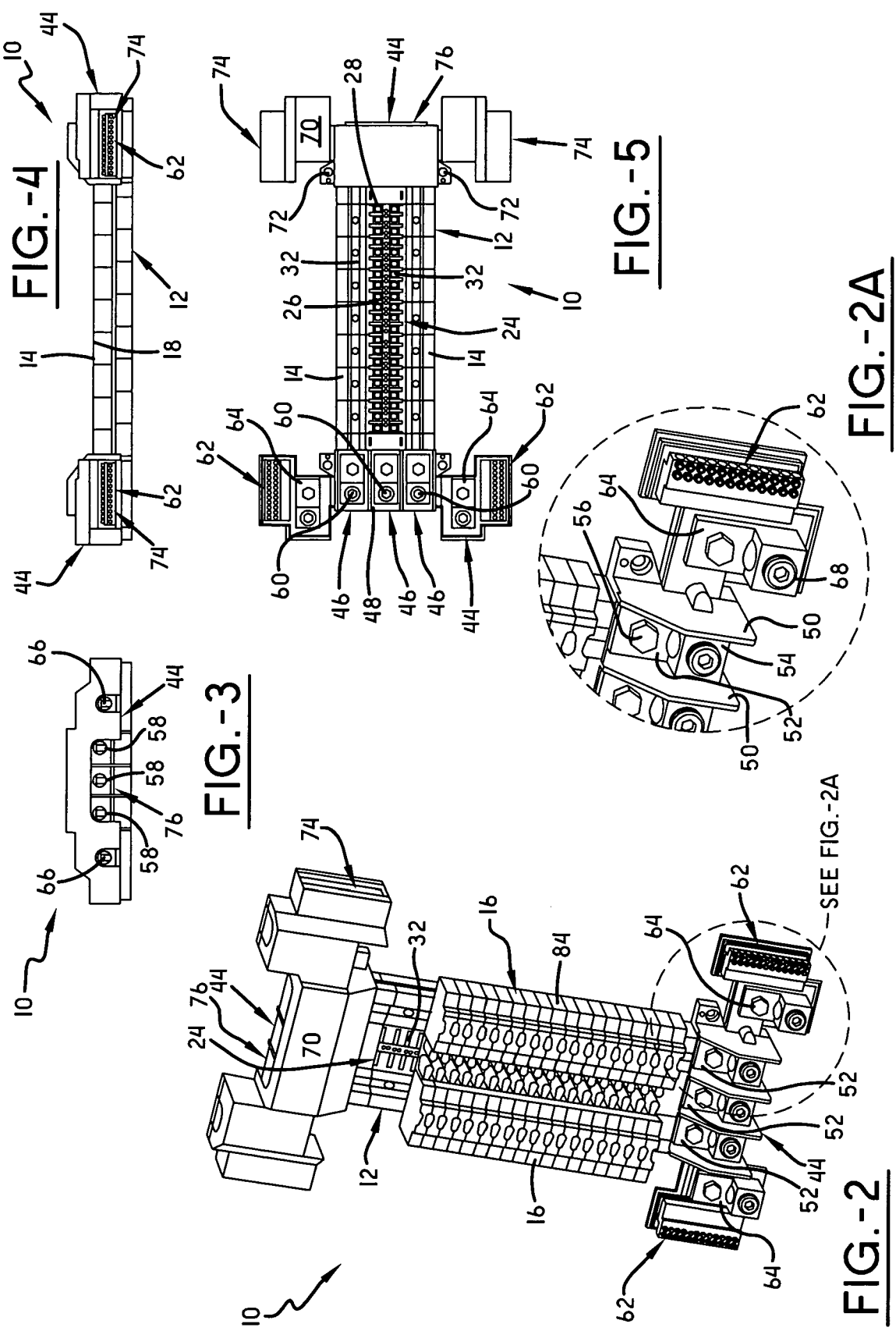

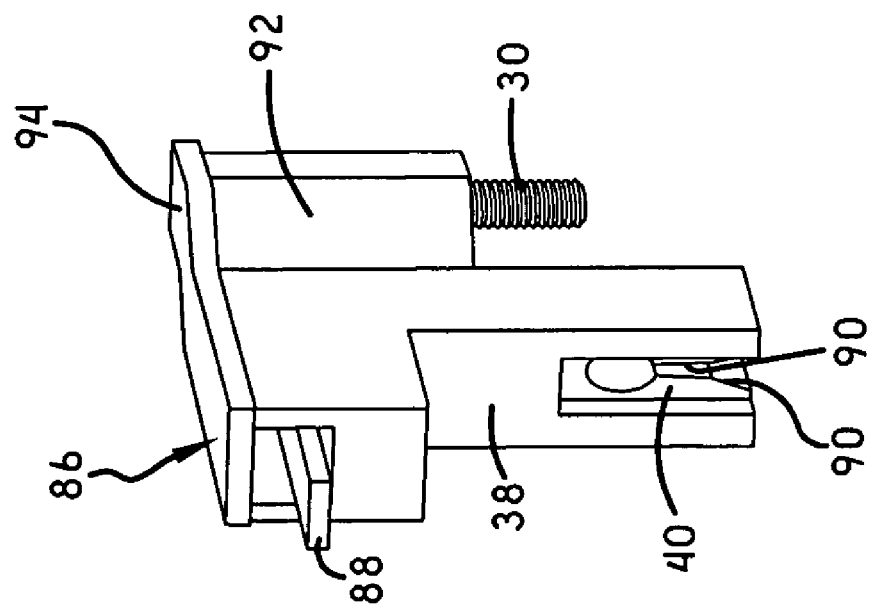
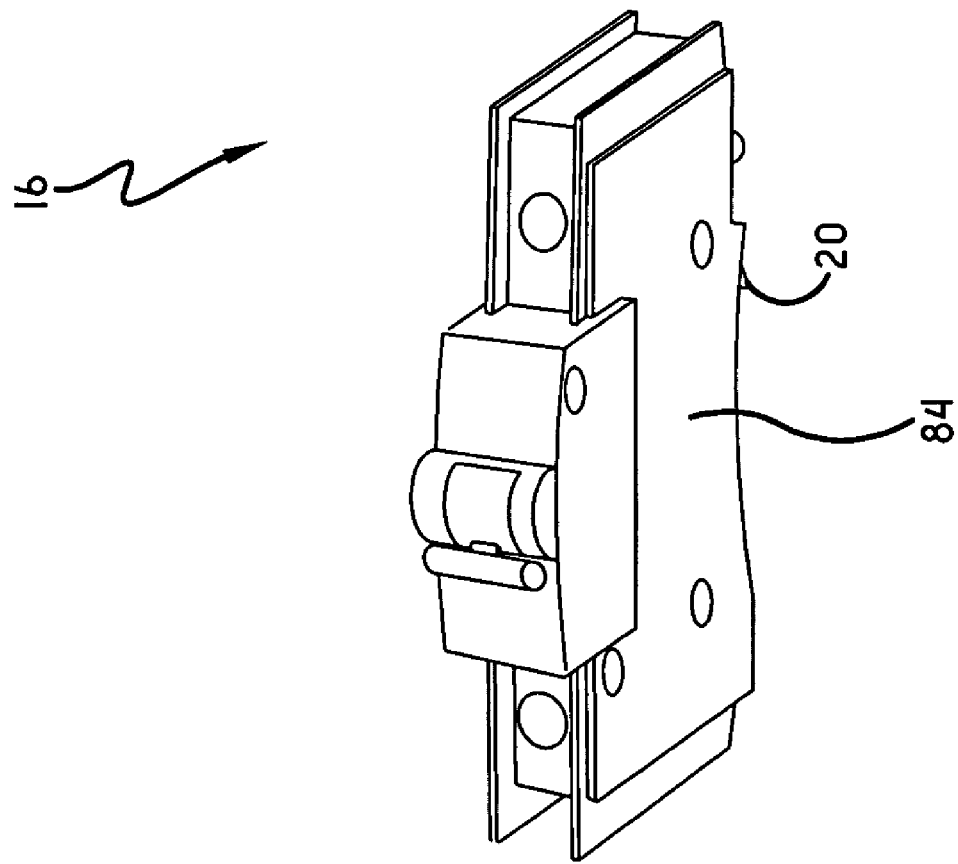
FIG.-15

PANELBOARD

CROSS-REFERENCE TO RELATED APPLICATION

This application claims the priority of U.S. provisional patent application Ser. No. 60/954,231 filed on Aug. 6, 2007 entitled "Panelboard" the contents of which are relied upon and incorporated herein by reference in their entirety, and the benefit of priority under 35 U.S.C. 119(e) is hereby claimed.

FIELD OF THE INVENTION

This invention relates to panelboards and more particularly to low voltage panelboards having improved safety features.

DESCRIPTION OF THE PRIOR ART

Panelboards (also known as loadcenters) are presently used in many industrial and commercial applications as a means of distributing electrical power from an electrical source to the multitude of downstream loads (e.g. lighting, outlets, electrical equipment, and the like). These panelboards provide a plurality of connection points for breakers to electrically couple with the electrical source. Typically that source is a two or three phase power supply. As is known in the art, the breakers are designed to open the circuit to downstream loads when a predetermined load is exceeded.

Though these prior art panelboards are effective in distributing power, many limitations exist. Due to their design, the prior art panelboards include many exposed "live" electrical components. These live components present an electrical shock risk during installation and maintenance. This is particularly seen because the breakers are typically secured to the panelboards by insertion of a screw directly into the bus bar that distributes the electricity. This requires the installer to physically touch (or touch through tools) the bus bar which may or may not be live.

In addition to safety issues related to installation and maintenance, prior art panelboards are also susceptible to failure during high current load conditions. In such instances, bus bars have a tendency to twist and consequently damage or destroy the panelboard. In extreme instances, fire and/or explosion may occur.

There is thus a need in the art for a panelboard that is safer for installers and maintenance personnel while also achieving improved performance and electrical load-bearing capability.

SUMMARY OF THE INVENTION

In general a panelboard in accordance with the present invention is adapted to mount and electrically connect to a plurality of circuit breakers. The panelboard includes a central body portion having a top surface, at least one bus bar positioned within the central body portion, a pair of opposed legs extending the longitudinal length of the central body portion, a plurality of wells extending downwardly from the top surface and having prongs at the bottom of each well, and wherein the prongs are electrically connected to the at least one bus bar.

In accordance with another aspect of the present invention a panelboard is adapted to mount and electrically connect to a plurality of circuit breakers. The panelboard includes a central body portion having a top surface, at least one bus bar positioned within the central body portion, a plurality of electrical connection points adapted to selectively electrically couple to the circuit breakers, and wherein the central body portion is filled with an electrically non-filling material, the filling material being adapted to structurally support the at least one bus bar.

DESCRIPTION OF THE DRAWING

FIG. 2 is a perspective view of the panelboard with the cover removed from one end and a plurality of circuit breaker assemblies mounted thereto.

FIG. 2A is an enlarged view of area A of FIG. 2.

FIG. 3 is a front view of the panelboard.

FIG. 4 is a side view of the panelboard.

FIG. 5 is a top view of the panelboard with the cover removed from one end.

FIG. 15 is an exploded view of the circuit breaker assembly.

DETAILED DESCRIPTION

Figure 1A:
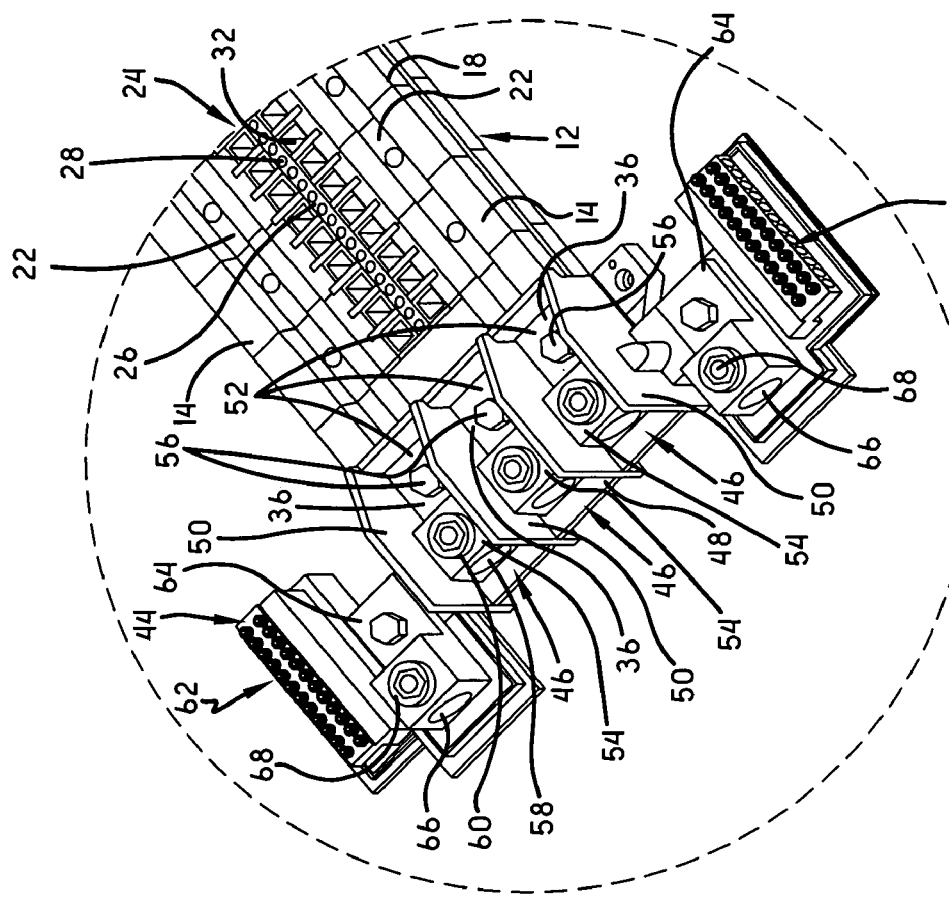
FIG. 1A is an enlarged view of area A of FIG. 1.
Figure 1:
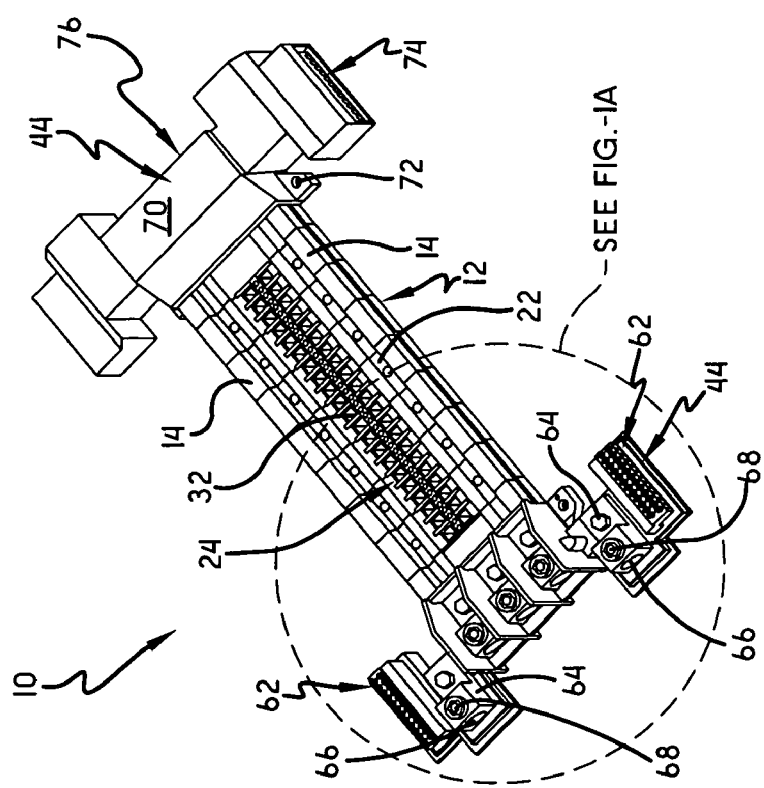
FIG. 1 is a perspective view of a panelboard of the present invention with the cover removed from one end.
Figure 6:
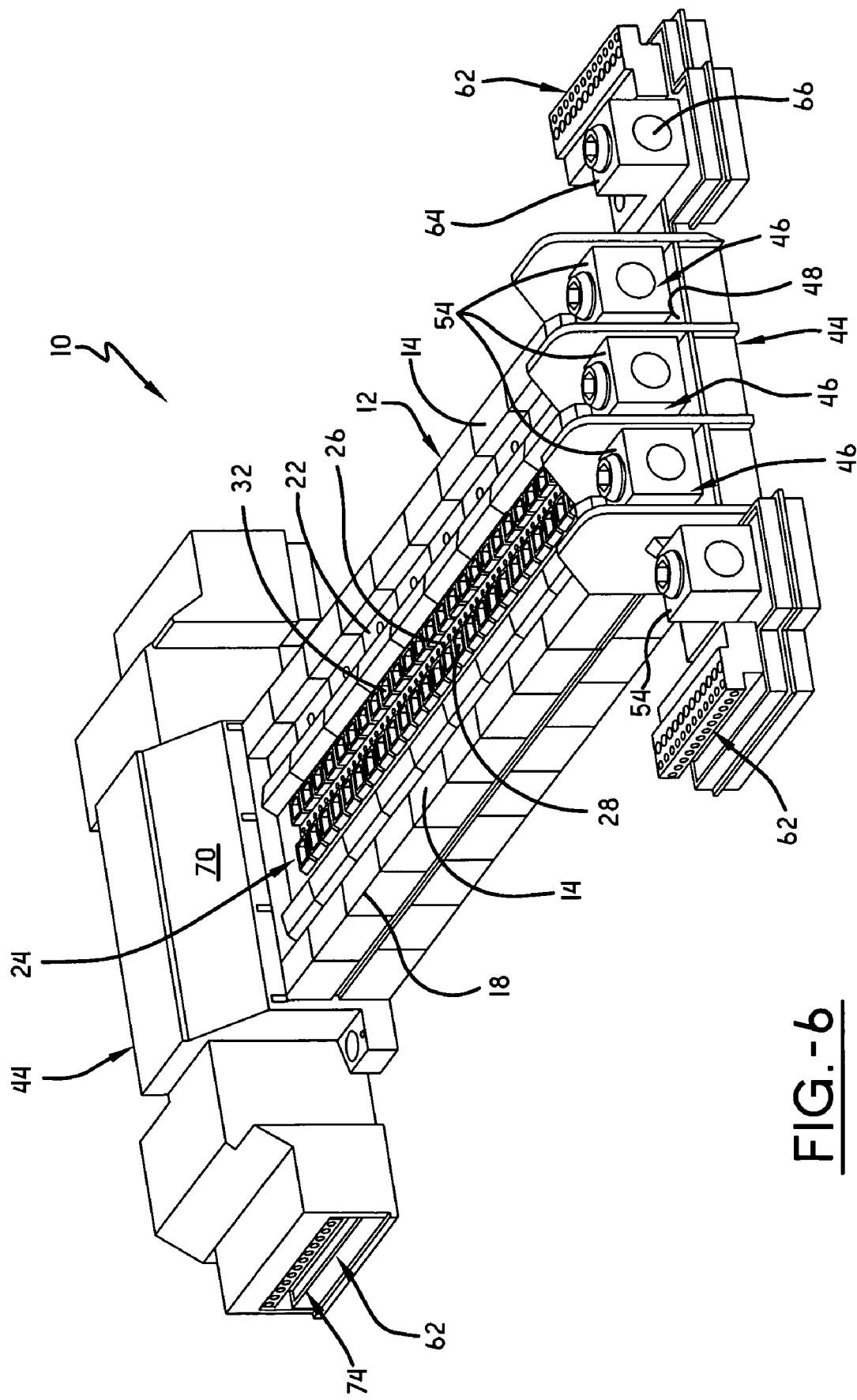
FIG. 6 is a perspective view of the panelboard with the cover removed from one end.
Figure 7:
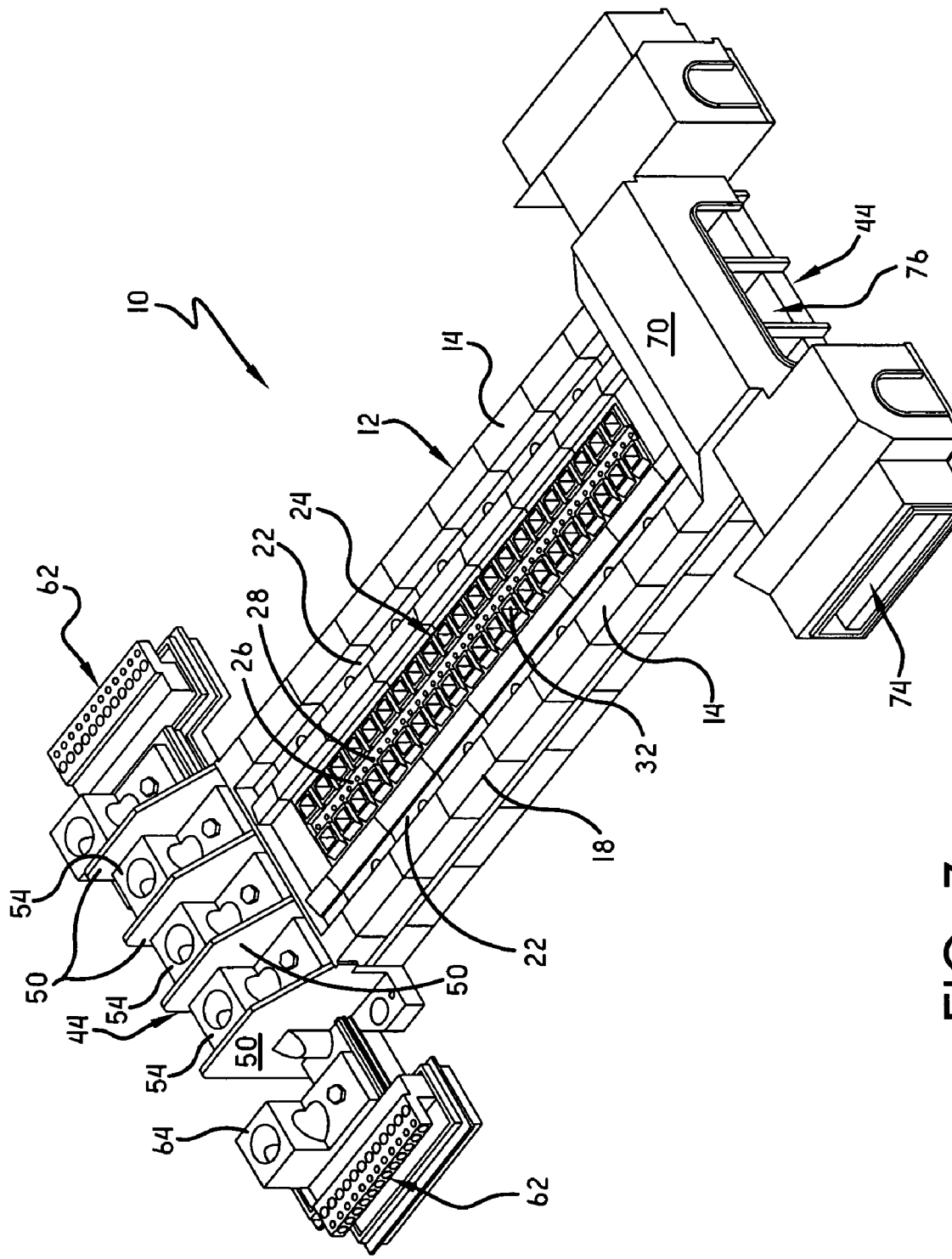
FIG. 7 is a perspective view from an alternate angle and with the cover removed from one end.
Figure 8:
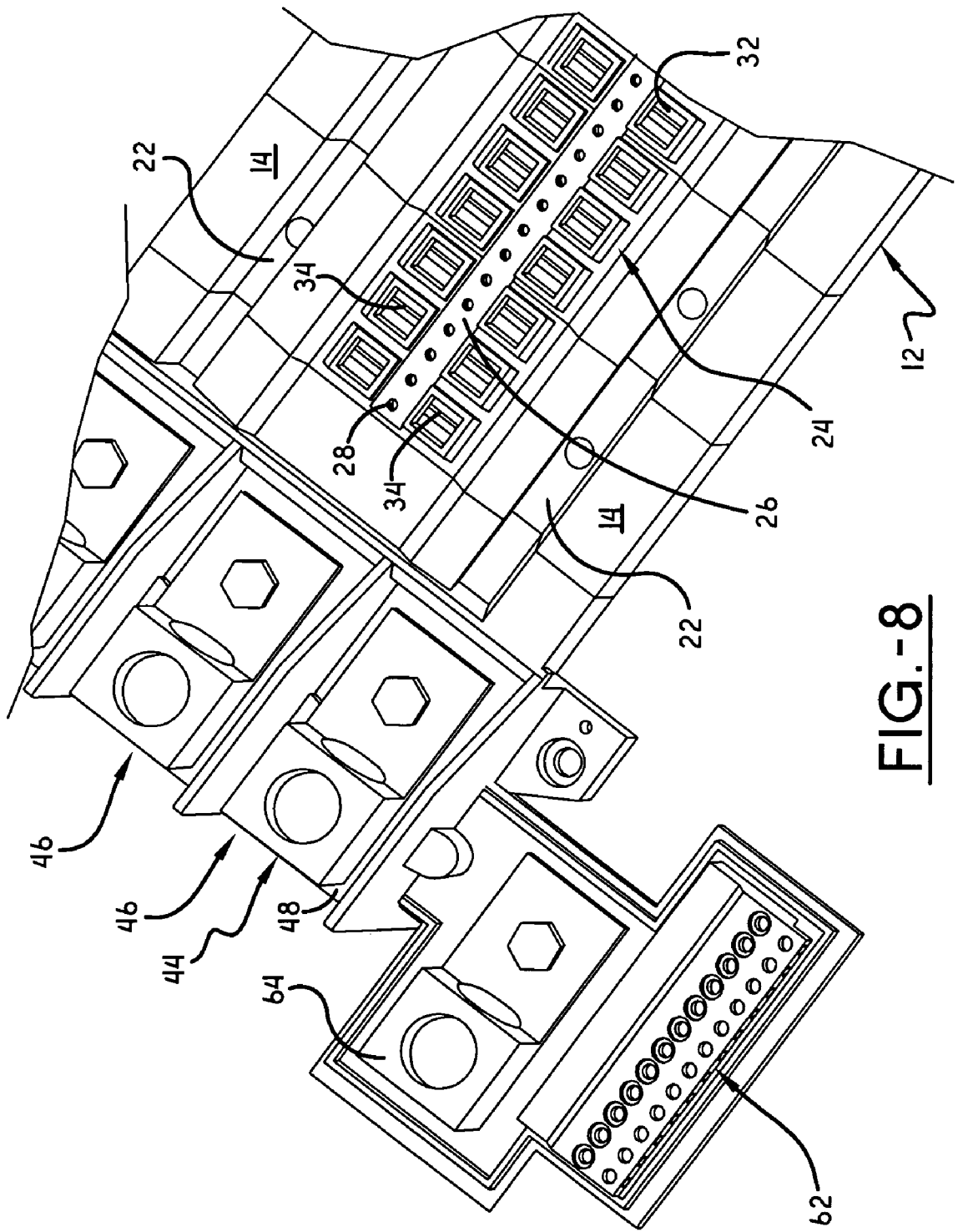
FIG. 8 is an enlarged perspective view showing the end bracket with the cover removed.
Figure 9:
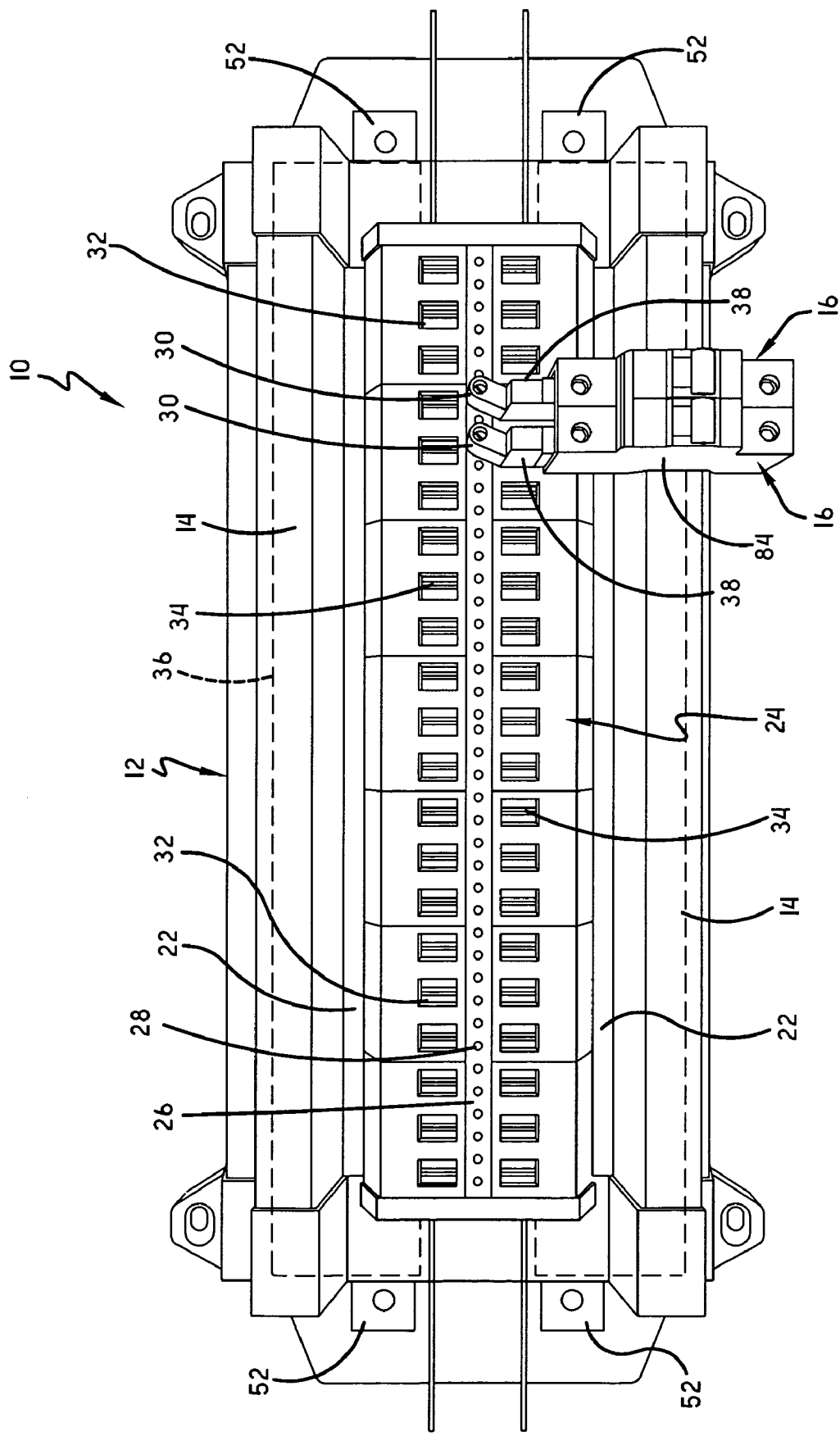
FIG. 9 is a top view of a panelboard according to the present invention with the end brackets removed.

Referring now to FIGS. 1-9, a panelboard is shown and generally indicated by the numeral 10. Panelboard 10 includes a central body portion 12 in the form of an elongated rectangle. Body portion 12 includes a pair of mounting legs 14 that extend substantially the entire longitudinal length of central body portion 12. Legs 14 are provided as a mounting area for one or more breaker assemblies 16 (See FIGS. 2 and 9). To that end, legs 14 are contoured to receive breakers 16 and may include a longitudinally extending ledge 18 along the side surface thereof. As will become apparent, ledge 18 provides a capture point for a mounting tab 20 (see FIG. 15) on breaker assembly 16. Mounting legs 14 may further include a ventilation groove 22 that extends longitudinally along the top surface thereof. Ventilation grooves 22 provide a means for escape of hot gases produced when a circuit breaker opens during a fault condition.

Central body portion 12 includes a junction area 24 located centrally of the opposed mounting legs 14. Junction area 24 extends substantially the entire longitudinal length of central body portion 12. A mounting strip 26 is secured centrally on the top surface of junction area 24 and extends substantially the entire longitudinal length of central body portion 12. Strip 26 includes a plurality of spaced threaded holes 28 that are adapted to receive a threaded fastener 30 (see FIG. 15) that secures circuit breaker assembly 16 to panelboard 10. Circuit breaker assembly 16 is secured to panelboard 10 by positioning the mounting tab 20 on ledge 18 and then inserting and tightening fastener 30 in one of aligned holes 28. Mounting strip 26 may be composed of metallic materials such as steel or aluminum for added strength. However, strip 26 is electrically insulated from any of the live electrical connections in panelboard 10. Thus, circuit breaker assembly 16 may be installed on panelboard 10 without contacting any live electrical connections either directly or with a tool.

Junction area 24 further includes a plurality of wells 32 arranged in a pair of opposed rows located on either side of strip 26. A prong 34 extends upwardly from the bottom of each well 32. As will be discussed in greater detail below, each prong 34 is electrically connected to one of a plurality of bus bars 36 (see FIG. 10). Prongs 34 are recessed within wells 32 (i.e. each prong 34 extends upwardly by a distance less than the depth of the wells 32). Thus prongs 34 are shielded from accidental contact during servicing and installation of breaker assemblies 16. As will be discussed later in greater detail, and with reference to FIG. 15, each circuit breaker assembly 16 includes a projection 38 that extends downwardly and is partially received in well 32. At the bottom end of projection 36 is a bus connector 40 that contacts prong 34 to electrically connect breaker assembly 16 to the respective bus bar 36. Projection 38 includes a shape that may be slightly smaller than well 32 so that, when inserted, the prong 34 and bus connector 40 are inaccessible by a human finger or tool. In this manner, inadvertent contact with live electrical connections is prevented.

Panelboard 10 is scalable, as not all bus connections (wells 32) may be in use at any given time. The prongs 34 in unused wells 32 are protected from inadvertent contact due to their recessed position within wells 32. Further, unused wells 32 may be covered by a cap (not shown) that snaps into place over unused wells 32 to completely prevent penetration into well 32 by a finger or tool.

Bus bars 36 extend beyond central body portion 12 at both longitudinal ends into an end bracket 44. Both end brackets 44 are identical in structure and thus, only one bracket 44 will be described. End bracket 44 includes three receiving channels 46 defined by a bottom wall 48 and upwardly extending walls 50. Each channel 46 receives an outwardly extending portion 52 of one of the three bus bars 36. In the present embodiment, the outwardly extending portion 52 is in the form of block of metal having a thickness greater than the rest of bus bar 36. This provides greater strength so that a connector 54 may be secured thereto with a fastener 56. One connector 54 is received in each channel 46 and provides a port 58 into which an incoming electrical line (not shown) may be received. The electrical line may be secured therein by a fastener 60. In this manner, electrical cables are electrically connected to each bus bar 36.

End bracket 44 further includes a ground or neutral terminal 62. When installed, the terminal 62 of one end bracket 44 is connected to ground/neutral through a connector 64 having a port 66. The ground/neutral electrical cable (not shown) is secured in port 66 by a fastener 68. As can be seen, each end bracket 44 includes two ground/neutral terminals 62. Terminals 62 on each bracket may be electrically connected by a connector (not shown) that extends beneath channels 46. Thus, the ground/neutral terminals 62 may be conveniently placed on either side of bracket 44. Also, it should be appreciated that, in use, the terminals 62 of one end bracket 44 may serve as the ground terminals, and the terminals of the opposing bracket 44 may serve as the neutral terminals.

A cover 70 may be secured to each end bracket 44 to prevent direct contact with live electrical connections. Cover 70 is secured thereto by a fastener 72 that is received in a hole 74 in end bracket 44. As can be seen in FIGS. 3 and 4, when cover 70 is installed, side openings 74 allow access to terminals 62 and a front opening 76 allows access to connectors 54. Because connectors 54 are recessed within channels 46 safety is promoted because the live electrical connection is consequently recessed in end brackets 44.

Referring now to FIGS. 9-12, the internal arrangement of bus bars 36 in central body portion 12 will be described. As previously discussed, three bus bars 36 may be provided to transfer electricity to breaker assemblies 16. In the embodiments disclosed in FIGS. 9-12, only two bus bars are shown. It should be appreciated, however, with reference to FIG. 12, that a third bus bar may be provided centrally, between the shown bus bars 36. As can be seen, bus bars 36 are relatively thin and flat. In one embodiment bus bars 36 are composed of copper and have a thickness of less than $1/16$ of an inch. In these or other embodiments bus bars 36 include a thickness of about $1/32$ of an inch. In these or other embodiments, at least one bus bar 36 includes a width of at least three (3) inches. In these or other embodiments the width of bus bar 36 is about four (4) inches. The above described dimensions provide an aspect ratio enables efficient current transfer as well as large surface area. In one or more embodiments, the aspect ration of the present invention is greater than 48 (i.e. 3:.0625).

Figure 10:
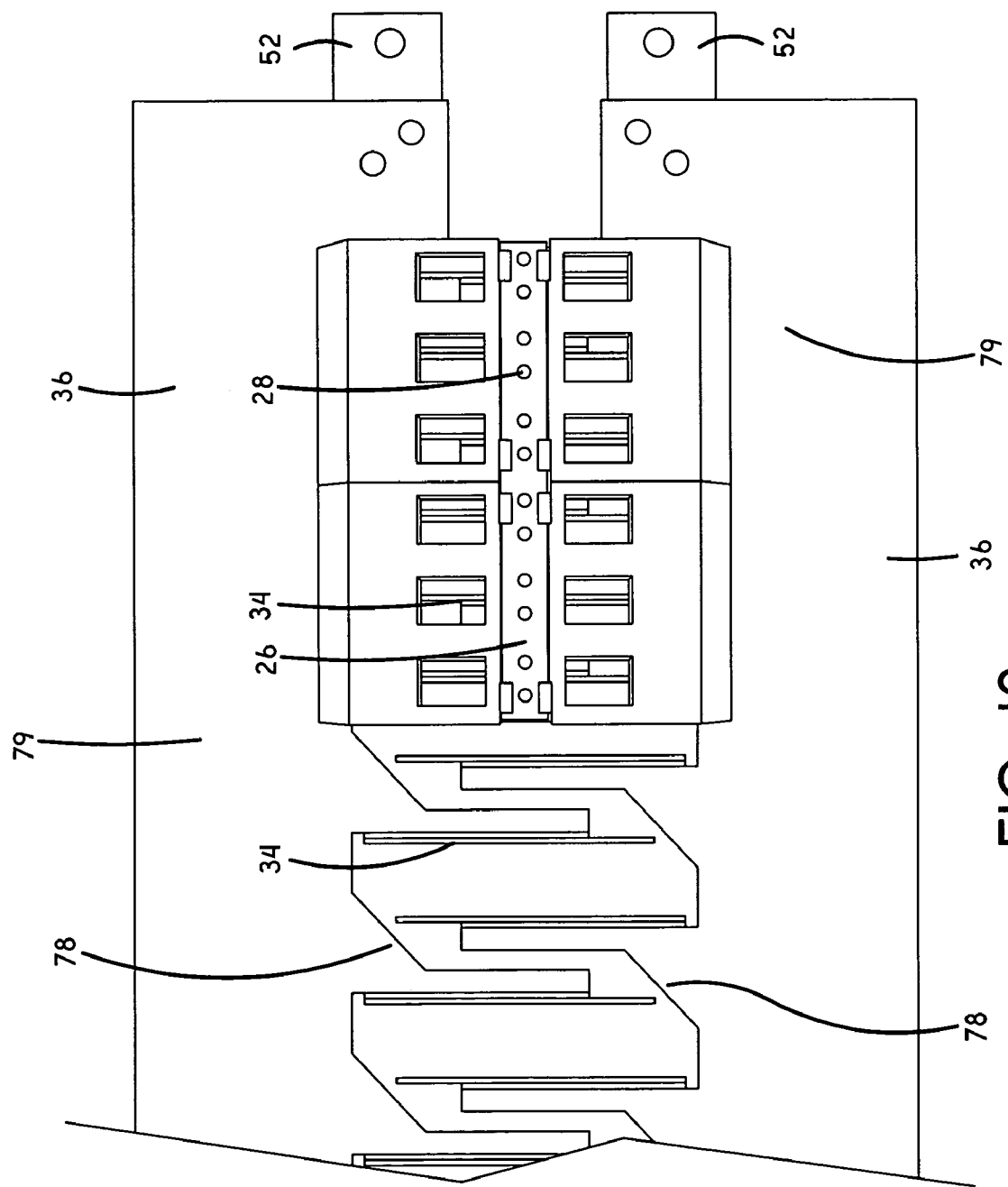
FIG. 10 is a partial top view of a pair of bus bars and a portion of the junction area superimposed over the bus bars.
Figure 11:
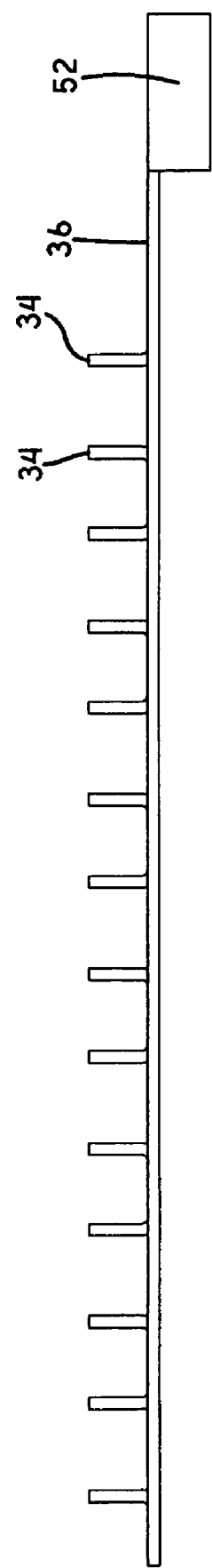
FIG. 11 is a side view of the bus bars of FIG. 10.

Bus bars 36 include centrally projecting fingers 78 that extend inwardly toward junction area 24, each aligning with two opposed wells 32. As shown in the figures, fingers 78 may be integral (i.e. made of the same contiguous piece of metal) with the main longitudinally extending portion 79 of bus bars 36. As shown in FIGS. 10 and 11, prongs 34 extend upwardly from a side edge of fingers 78, such that a single prong 34 is exposed in two adjacent wells 32. Prongs 34 may be integral (i.e. made of the same contiguous piece of metal) with the fingers 78. The integral construction of bus bar 36 minimized internal resistance and thus reduces heat generation. Thus, in the present embodiment, prongs 34 from alternating bus bars 36 are exposed in alternating pairs of wells 32. It should be appreciated that a third bus bar 36 may be positioned centrally between the two shown bus bars 36. Also, it should be appreciated that each bus bar 36 is electrically isolated from each other bus bar 36.

Figure 12:
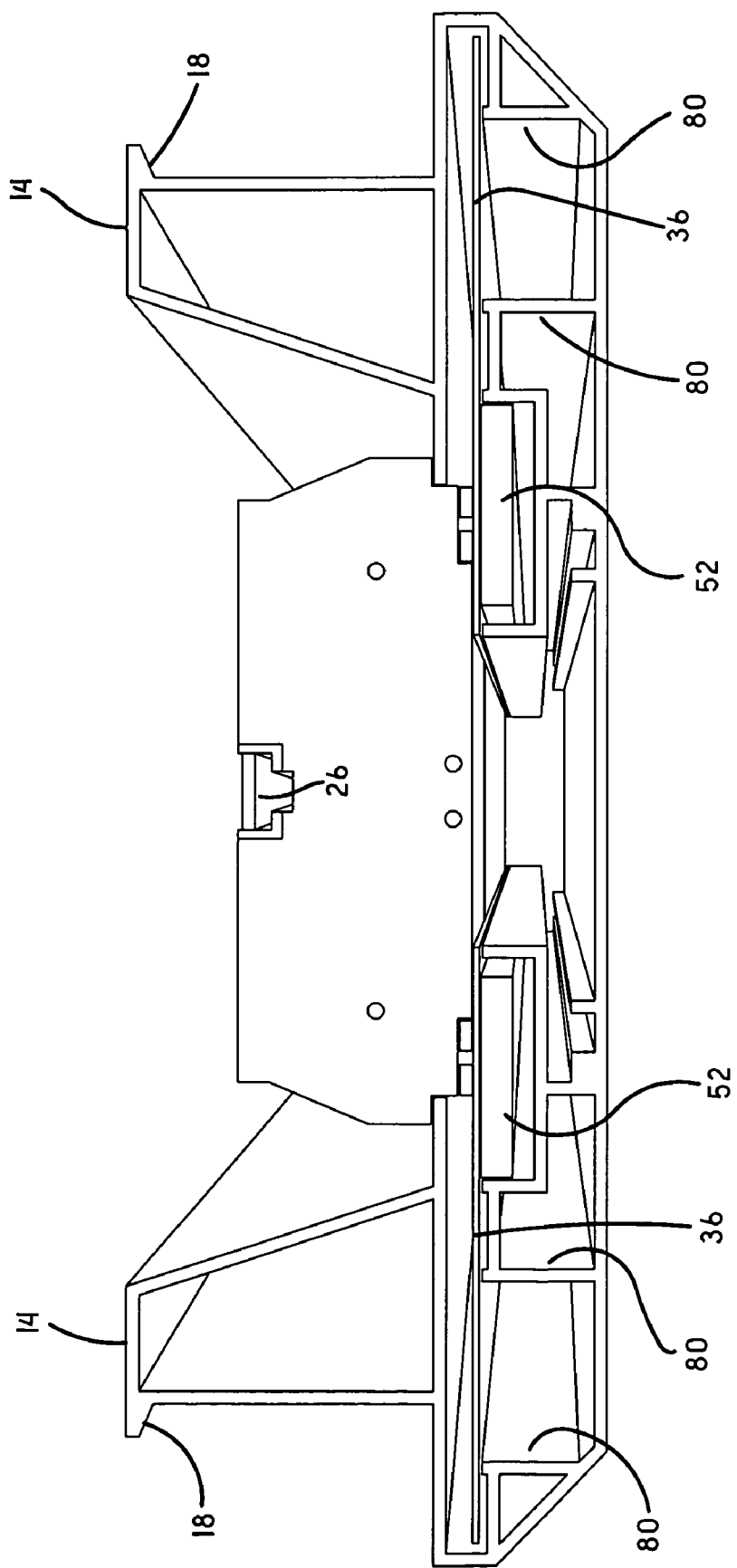
FIG. 12 is an end perspective view of a panelboard according to the present invention with end brackets removed and prior to filling material application.
Figure 13:
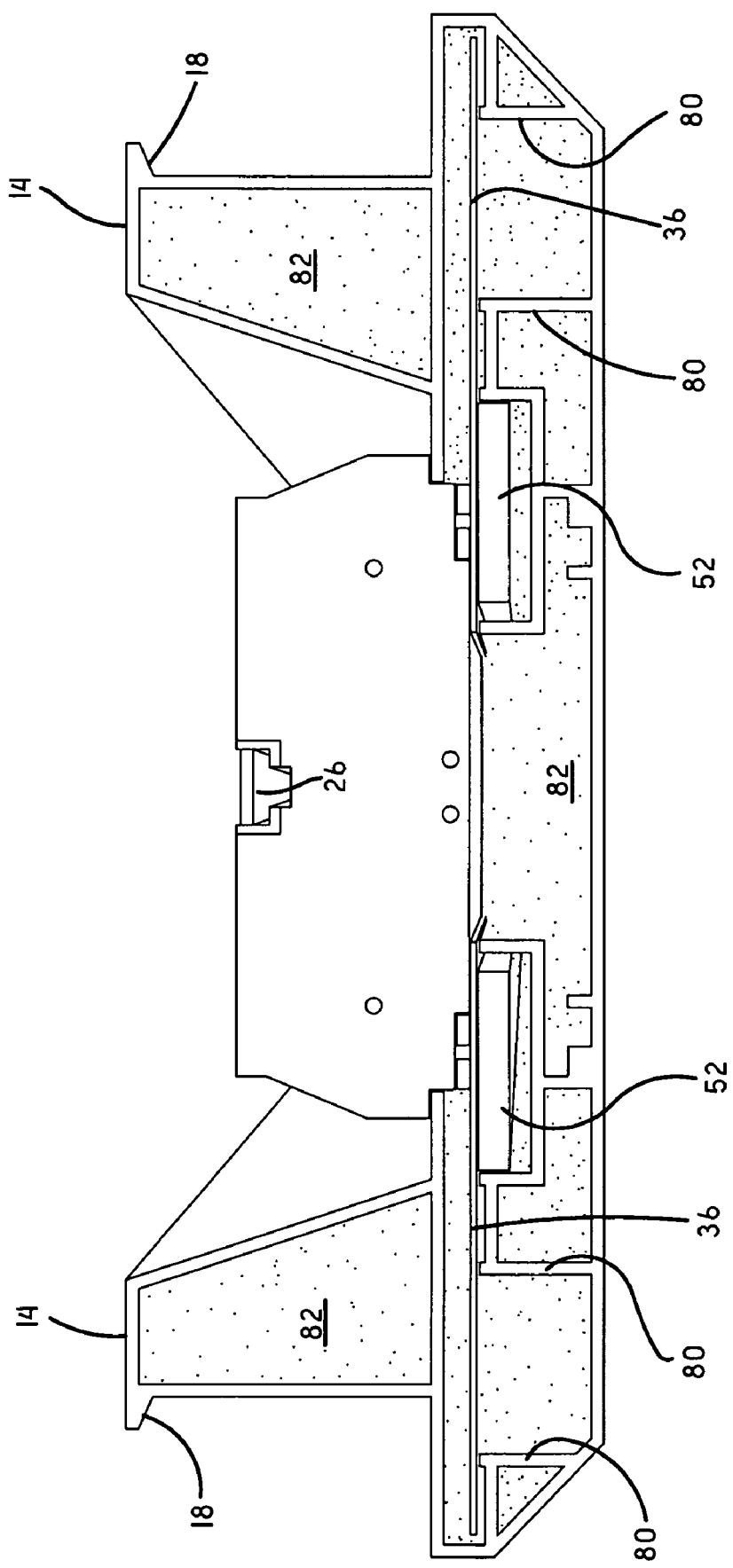
FIG. 13 is an end perspective view of a panelboard according to the present invention with end brackets removed and after filling material application.

Referring now to FIGS. 12 and 13, it can be seen that bus bars 36 are internally supported by one or more upstanding legs 80 that extend the longitudinal length of central body portion 12. Once assembled, the internal volume of central body portion 12 is filled with an electrically non-conductive filling material 82. Filling material 82 provides electrical insulation, adds physical strength to body portion 12 and supports and maintains bus bars 36 in proper position. In one embodiment, filling material is a polyurethane resin. In these or other embodiments the filling material is a semi-rigid plastic material. In these or other embodiments, filling material may be ICTHANNE ET 245 A_V0 available from International Concept Technology, France. In still other embodiments, the filling material may be a foam.

As with FIG. 11, for sake of clarity, FIGS. 12 and 13 do not show a third, central bus bar, though one may be incorporated. The bus bars 36 are completely encapsulated in insulating material and not exposed to open air (except for extending portions 52).

Not only does the filling material 82 provide excellent insulating properties, it also helps prevent bus bar failure. As discussed above, during high current fault conditions, prior art bus bars tend to twist and ultimately destroy the panelboard from the inside. In the present invention, this failure mode is prevented because the filling material 82 acts on nearly every point of the bus bar 36, as opposed to prior art bus bars which are secured at finite points to insulators within the housing. Also, the large lateral surface area of the bus bars (due to the larger width dimension) provides a considerable amount of surface area upon which the filling material can contact. This enables the panelboard of the present invention to withstand larger current overloads than prior art panelboards.

Figure 14:
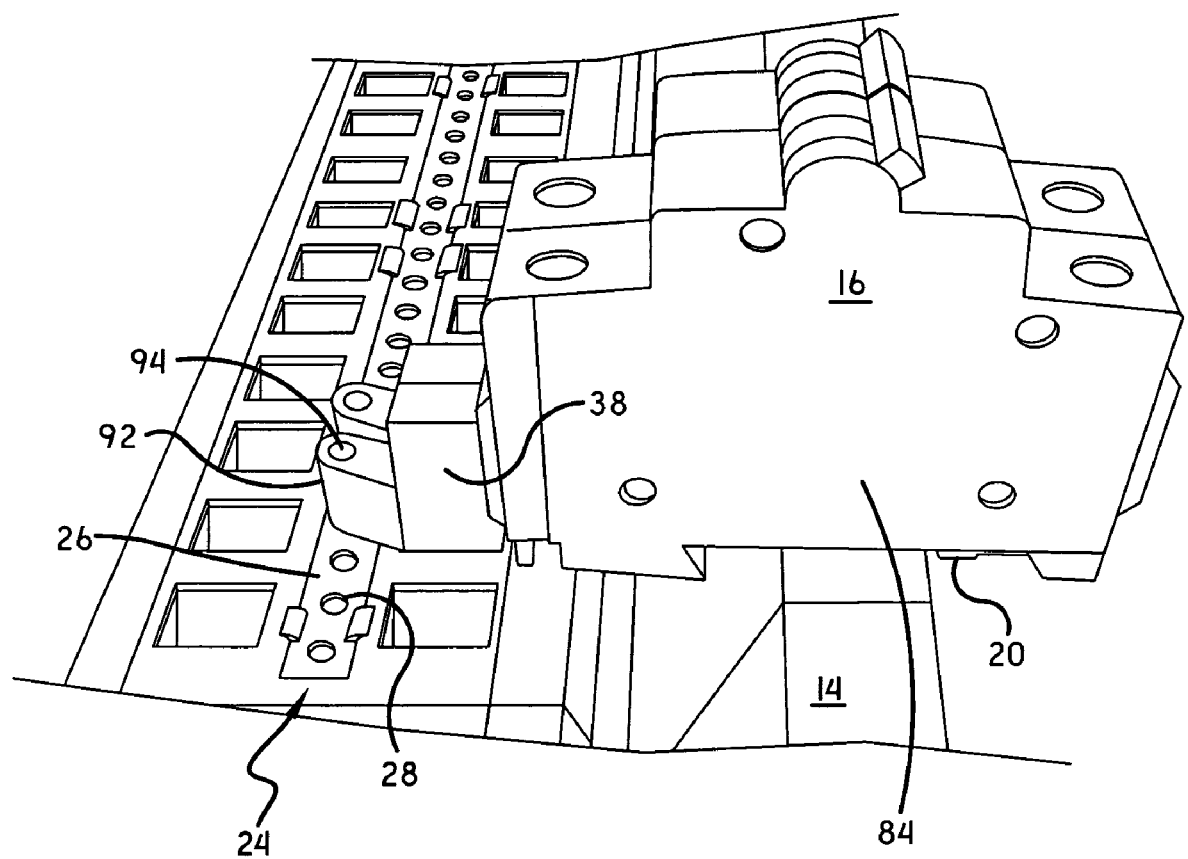
FIG. 14 is an enlarged perspective view of a pair of circuit breaker assemblies installed onto the panelboard.

Referring now to FIGS. 14 and 15, the circuit breaker assembly 16 is shown. Breaker assembly 16 includes a breaker 84 adapted to open the electrical connection when a predetermined current is exceeded. In one embodiment, breaker 84 is a current limiting breaker.

An adaptor 86 is secured to the front end of breaker 84 and includes a tab 88 that is electrically connected to bus connector 40. Bus connector 40 includes an electrical contact in the form of a pair of opposed teeth 90 that are adapted to resiliently engage electrical prong 34. Thus, an electrical connection is made from longitudinally extending portion 79 of bus bar 36, through finger 78, to electrical prong 34. When the projection 38 is inserted into well 32, teeth 90 engage prong 34, thereby electrically connecting prong 34 to circuit breaker 84. Adaptor 86 includes an extension 92 that extends forwardly and includes a bore 94 adapted to receive fastener 30 therein. As discussed above, the fastener 30 is received in threaded hole 28 to secure breaker assembly 16 to panelboard 10. Extension 92 may be longitudinally offset (See FIG. 9) to enable opposing breaker assemblies to be mounted to panelboard 10.

It should thus be appreciated that the above described panelboard enables the safe and easy installation of circuit breakers. Further, the presently described panelboard achieves improved electrical loading performance. It is to be understood that the description of the foregoing exemplary embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A panelboard for mounting and electrically connecting to a plurality of circuit breakers, the panelboard comprising:
    a central body portion having a top surface;
    a pair of opposed legs extending the longitudinal length of said central body portion;
    a plurality of wells extending downwardly from said top surface of said central body portion;
    at least one bus bar positioned within said central body portion;
    connector prongs disposed in the wells, respectively, said connector prongs being electrically connected to said at least one bus bar and being adapted to selectively electrically couple to the circuit breakers; and
    wherein said central body portion is filled with an electrically non-conductive filling material, said filling material being adapted to structurally support said at least one bus bar; and
    wherein the legs are filled with the electrically non-conductive filling material.

2. A panelboard according to claim 1 wherein said bus bar extends substantially the entire longitudinal length of said central body portion.

3. A panelboard according to claim 2 wherein said bus bar includes a width of at least three inches and a thickness of less than a quarter of an inch.

4. A panelboard according to claim 3 wherein said bus bar includes a width of about four inches.

5. A panelboard according to claim 1 wherein said at least one bus bar includes a width to thickness aspect ration of at least 48.

6. A panelboard according to claim 1 wherein said filling material surrounds substantially all of said bus bar.

7. The panelboard according to claim 1 further comprising an electrically insulated mounting strip positioned centrally on the top surface of said central body portion, said mounting strip having a plurality of holes adapted to receive fasteners to secure the breaker to said central body portion.

8. A panelboard according to claim 1 further comprising end brackets secured to opposed longitudinal ends of said central body portion, respectively.

9. A panelboard according to claim 8 wherein said end brackets each include a receiving channels and said at least one bus bar includes opposing outwardly extending portions, said outwardly extending portions being positioned in said receiving channels, respectively.

10. A panelboard according to claim 9, wherein each end bracket includes a pair of opposed ground terminals.

11. A panelboard according to claim 10, further comprising covers positioned over said end brackets, respectively, and wherein each of the end brackets and its associated one of the covers cooperate to define a front opening and at least one side opening.

12. A panelboard according to claim 1, wherein said legs each include a ledge, said ledges extending longitudinally along said legs, respectively, and being adapted to engage the circuit breakers.

* * * * *